Figure 1:
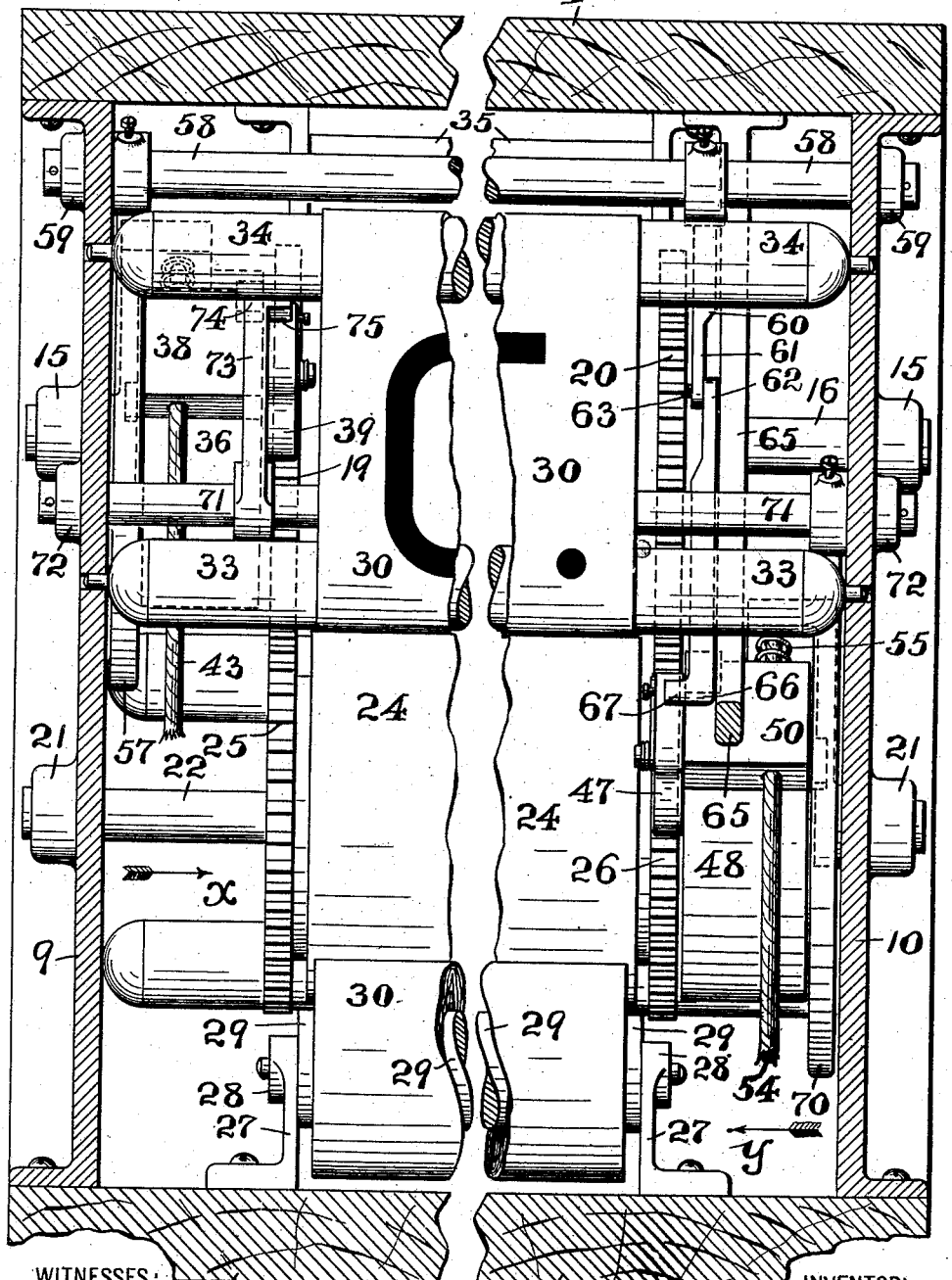

No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.

8 SHEETS—SHEET 1.

WITNESSES:
INVENTOR:
Harry E. Beach.
Per Benjamin B. Beach, Admr.
BY
Fred C. Fraentzel,
ATTORNEY No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.

8 SHEETS—SHEET 2.

WITNESSES:
INVENTOR:
Harry E. Beach.
Per Benjamin B. Beach, Adm'r
BY
Fred'k C. Fraentzel
ATTORNEY No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.

8 SHEETS—SHEET 3.

WITNESSES:
INVENTOR:
Harry E. Beach.
Per Benjamin B. Beach, Adm'
BY
Fred'k C. Fraentzel,
ATTORNEY

THE NORRIS PETERS CO., WASHINGTON, D. C.

No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.
8 SHEETS—SHEET 4.
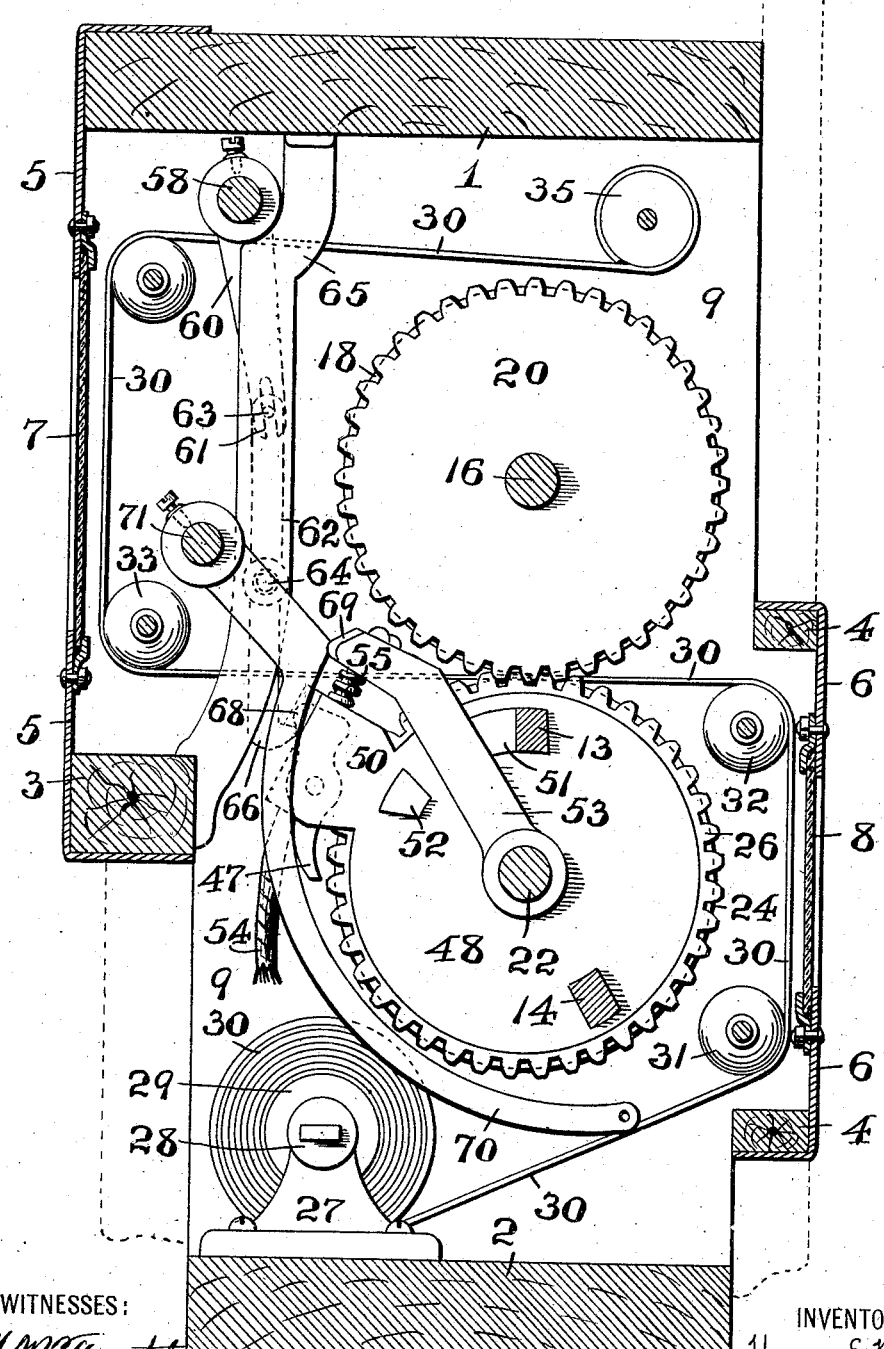
WITNESSES:
INVENTOR:
Harry E. Beach
Per Benjamin B. Beach Adm
BY Fred C. Fraentzel
ATTORNEY No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.
8 SHEETS—SHEET 5.
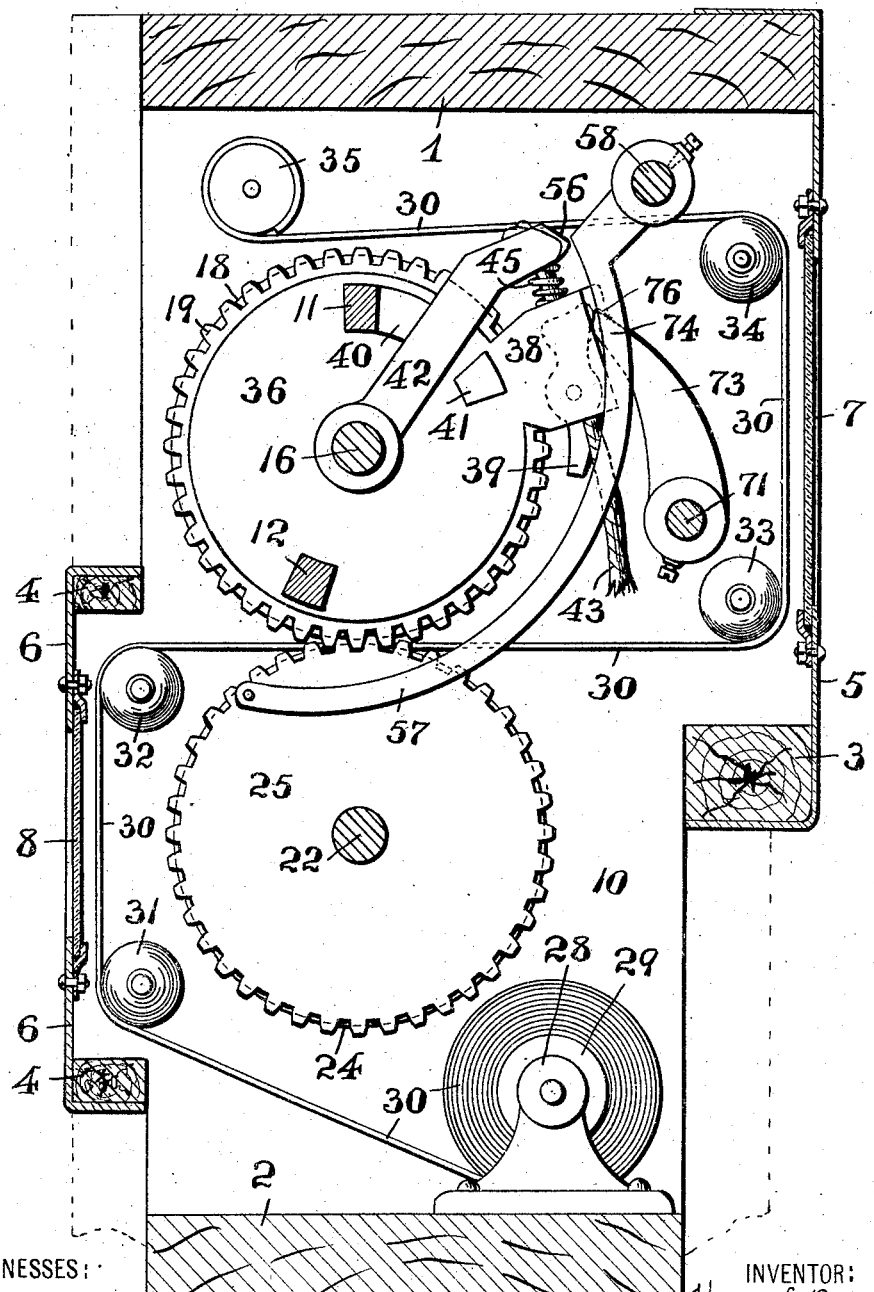
WITNESSES:
INVENTOR:
Harry E. Beach.
Per Benjamin B. Beach, Admr
By Fred'k C. Fraentzel
ATTORNEY No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.
8 SHEETS—SHEET 6.
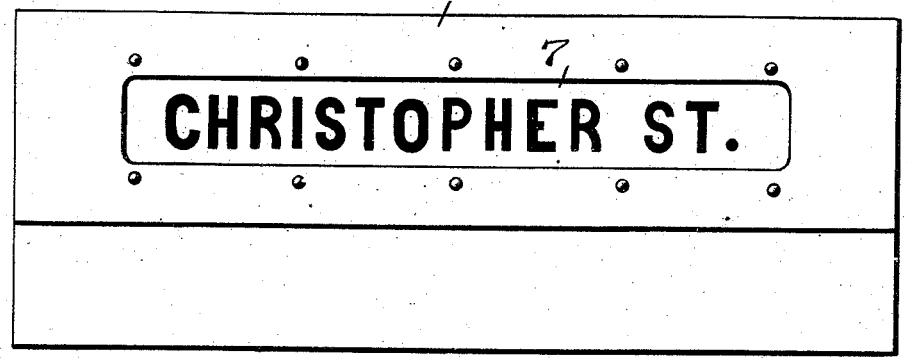
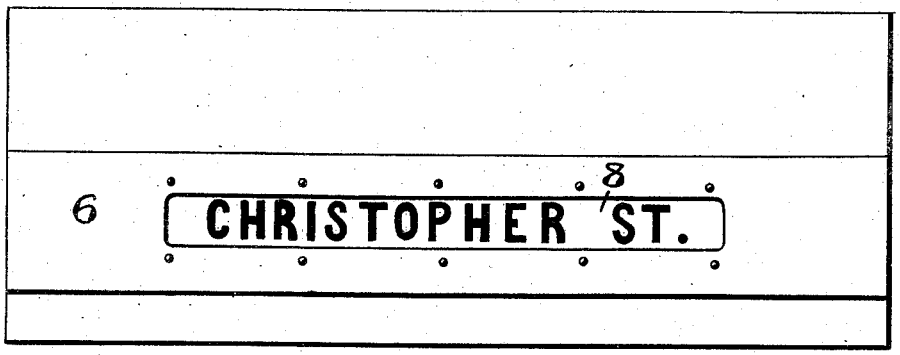
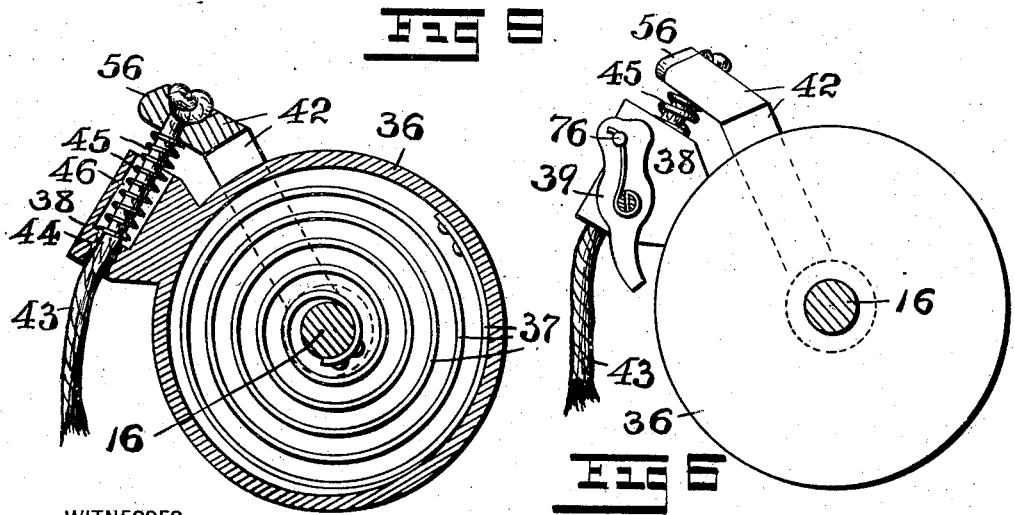
WITNESSES:
INVENTOR:
Harry E. Beach.
Per. Benjamin B. Beach, adm'r.
BY Fred'k C. Fraentzel,
ATTORNEY

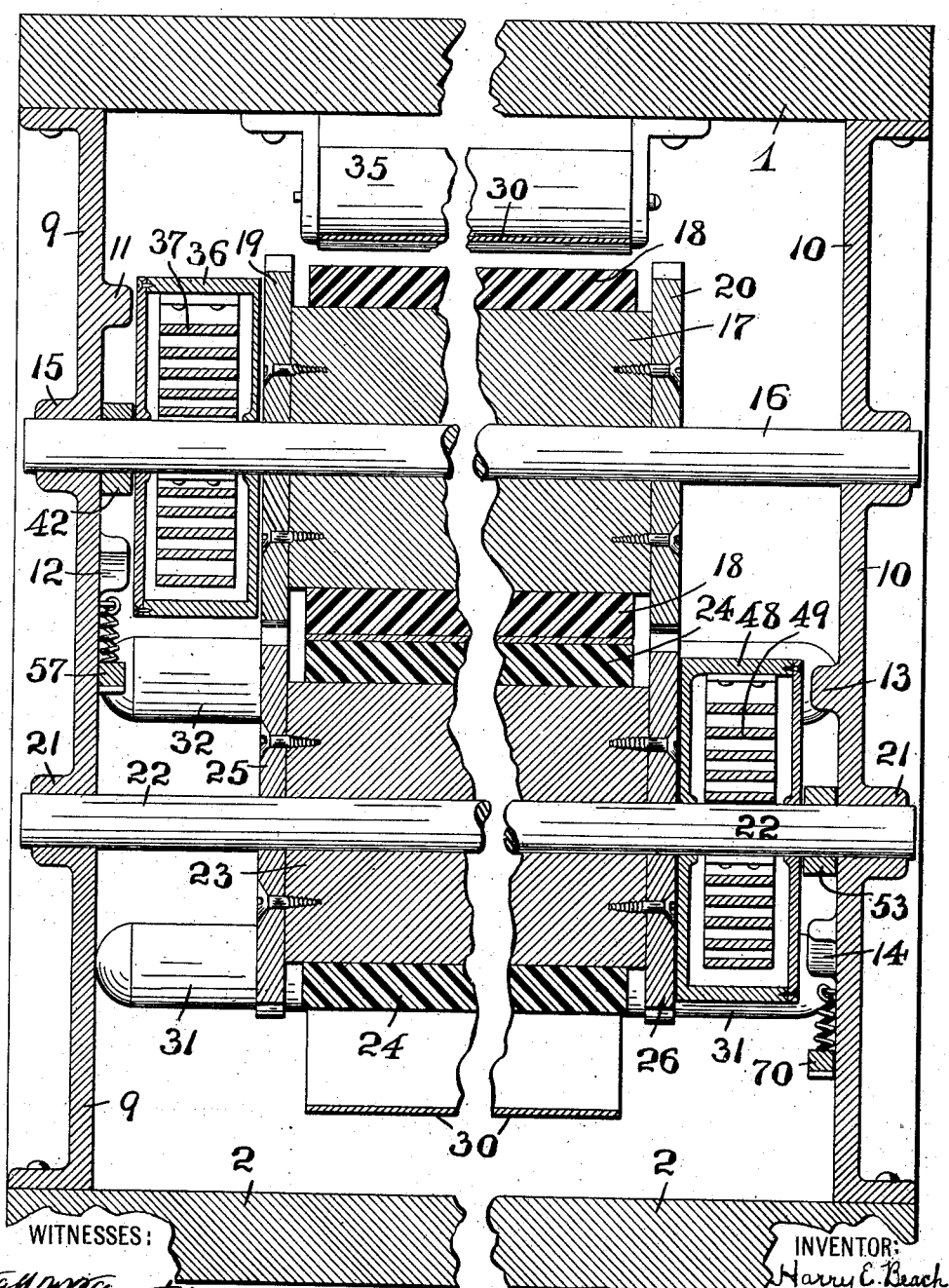

No. 851,216. PATENTED APR. 23, 1907.
H. E. BEACH, DEC'D.
B. B. BEACH, ADMINISTRATOR.
STREET OR STATION INDICATOR.
APPLICATION FILED MAR. 2, 1906.

8 SHEETS—SHEET 8.

WITNESSES:  
INVENTOR:  
Harry E. Beach,  
Per Benjamin B. Beach. Adm'r.  
BY  
Fred'k C. Fraentzel,  
ATTORNEY

UNITED STATES PATENT OFFICE.

BENJAMIN B. BEACH, OF NEWARK, NEW JERSEY, ADMINISTRATOR OF HARRY E. BEACH, DECEASED.

STREET OR STATION INDICATOR.

No. 851,216.  Specification of Letters Patent.  Patented April 23, 1907.

Application filed March 2, 1906. Serial No. 303,789.

*To all whom it may concern:*

Be it known that I, BENJAMIN B. BEACH, a citizen of the United States, and a resident of Newark, county of Essex and State of New Jersey, administrator of the estate of HARRY E. BEACH, late a citizen of the United States, deceased, and who did invent certain new and useful Improvements in Street or Station Indicators, do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference generally to improvements in station or street indicators for railway cars of the various kinds; and, the invention has for its principal object to provide a simply constructed and readily operated mechanism which may be placed in any desirable part of a car and is provided with a station or street indicating tape or other suitable device having the names of the stations or streets arranged or printed on its opposite sides, and the indicating device being provided with several windows through which the name of a station or street can be exposed to view and the same name of a station or street read from the various windows of the indicator and from different parts of the car in which the indicator is placed.

A further object of this invention therefore is to provide a station or street indicator with means of a simple and effectively operating mechanism for the purpose of exposing to view preferably at different windows, the name of a station or street; and, furthermore, to provide an apparatus of this character having an indicating tape or means on which the names of the stations or streets to be indicated are placed on the opposite sides thereof and are arranged in such a manner that the same name will be exposed at different windows in the casing of the apparatus.

Other objects of this invention not at this time more especially mentioned will be evident from the following specification.

With the various objects of the present invention in view, the said invention consists, primarily, in the novel station or street indicator hereinafter set forth; and, furthermore, this invention consists in the several arrangements and combinations of devices and parts, as well as in the details of the construction of the parts, all of which will be more fully described in the following specification and then finally pointed out in the clauses of the claims which are appended to and form a part of this specification.

The invention is clearly illustrated in the accompanying drawings, in which:—

Figure 2:
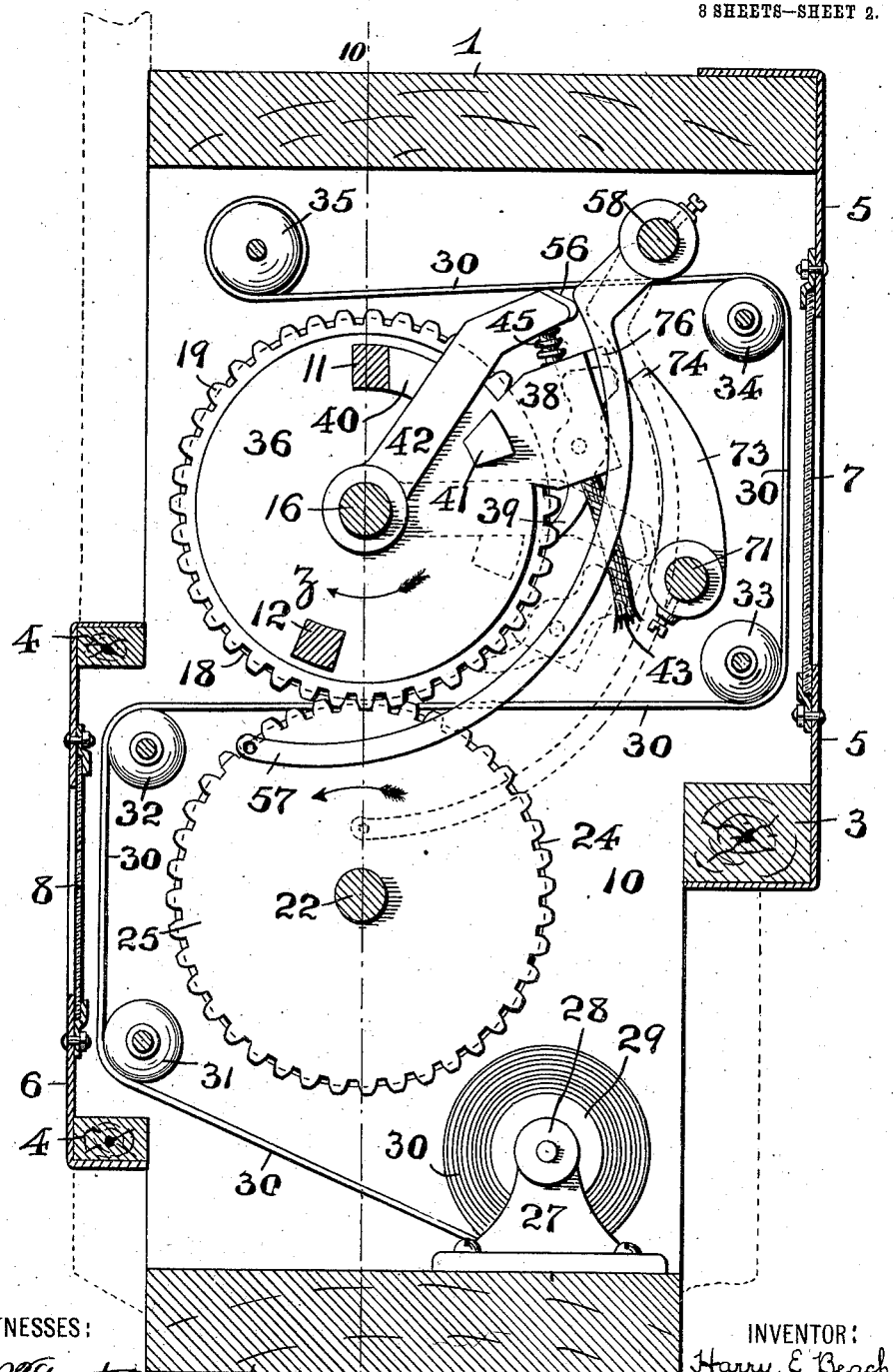
Figure 3:
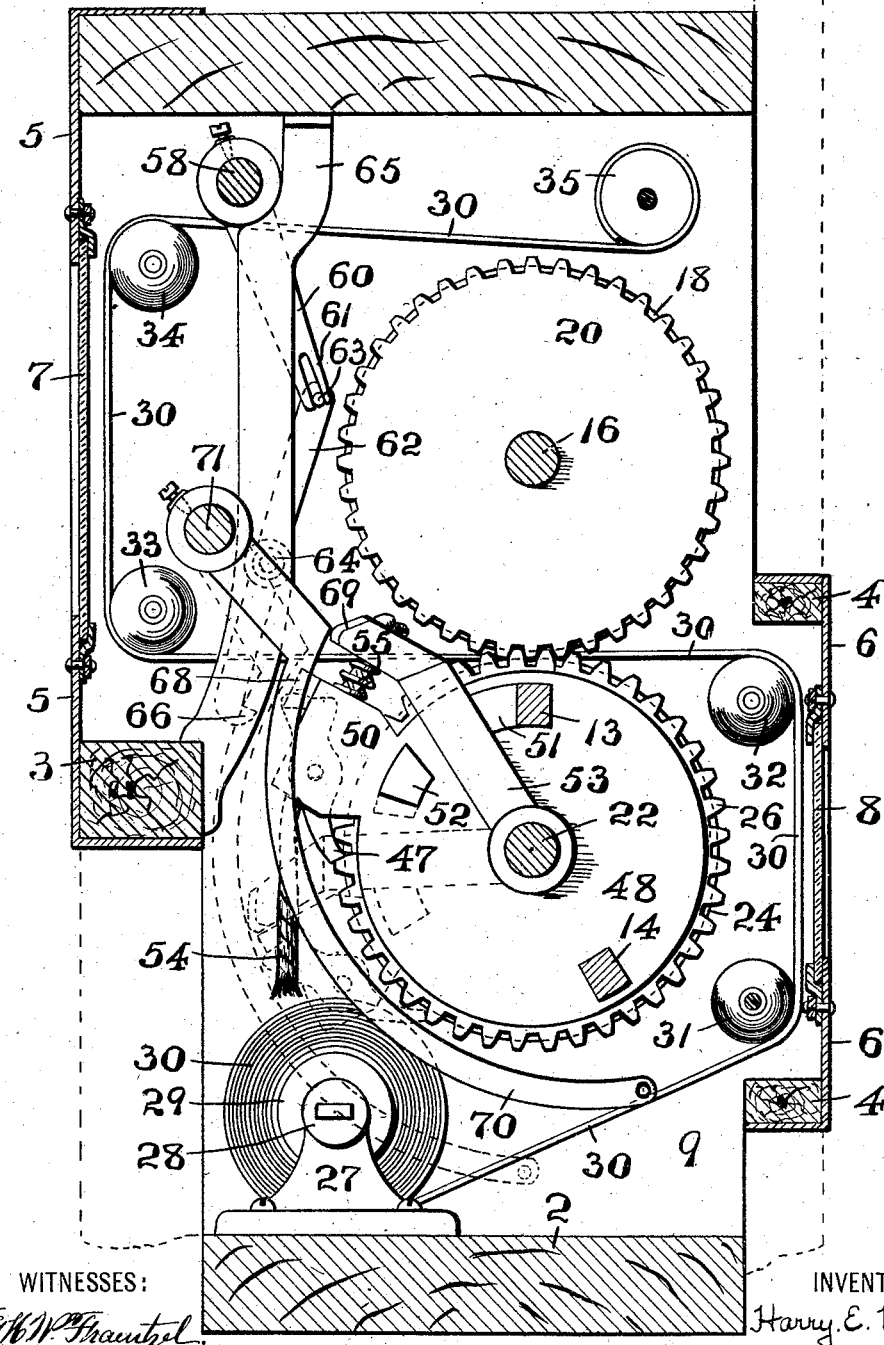
Figure 11:
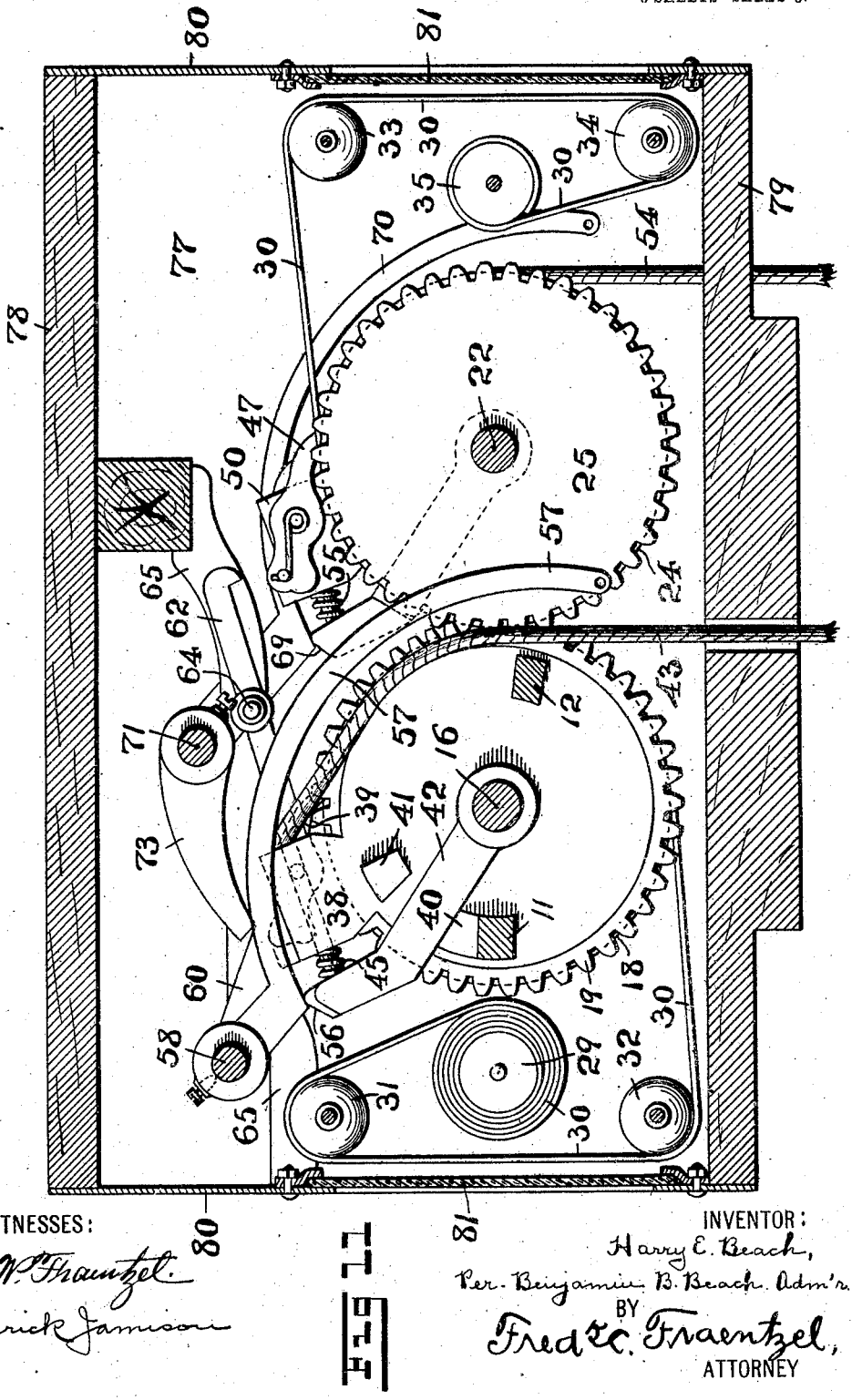

Figure 1 is a front elevation of the indicating apparatus embodying the principles of the present invention, the indicating tape and a certain system of rollers or cylinders, however, being represented in part only. Fig. 2 is a side elevation of the actuating mechanism of the apparatus, at the one side of the device, looking in the direction of the arrow X in said Fig. 1, with the one end-frame or side of the casing omitted from said view, the parts being represented in their normal initial positions, but also being represented in their actuated positions, in the dotted outline, for producing a movement of the indicating tape. Fig. 3 is a similar view of the actuating mechanism of the apparatus, at the other side of the device, looking in the direction of the arrow Y in said Fig. 1, with the end-frame of the side of the casing omitted, the parts being represented in their normal initial positions, but also being represented in their actuated positions, in the dotted outline, for producing a movement of the indicating tape. Fig. 4 is a view similar to Fig. 3, but representing the parts of the mechanism illustrated in said Fig. 3 in their locked or normally inoperative positions, when the parts of the mechanism represented in said Fig. 2 are being operated; and Fig. 5 is a view similar to Fig. 2, but representing the parts of the mechanism illustrated in said Fig. 2 in their locked or normally inoperative positions, when the parts of the mechanism represented in said Fig. 3 are being operated. Fig. 6 is a side view of one of a pair of spring-controlled cylinders or drums for actuating the feed rollers or cylinders over which the indicating tape passes, illustrating in connection therewith an operating arm or lever and a spring-pawl which is adapted to engage with a gear or other suitable device for actuating the feed roller; looking at the opposite end of the said cylinder or drum from that indicated in Figs. 2 and 5 of the drawings; and Fig. 7 is a transverse vertical section of the parts represented in said Fig. 6. Figs. 8 and 9 are elevations, on a reduced scale, of the indicating casing or frame, illustrating one arrangement of windows upon the opposite sides of the casing, and the manner of exposing the same name of a station of street from each window. Fig. 10 is a longitudinal vertical section, taken on line 10—10 in said Fig. 2. Fig. 11 is longitudinal vertical section of a casing provided with a modified arrangement of the indicating tape-feeding or actuating mechanism, this form of apparatus being more especially adapted for use in the center of a car, so that the indications of the stations or streets can be read from either end of the car.

Similar characters of reference are employed in all of the said hereinabove described views, to indicate corresponding parts.

It will be seen from the following detailed description of the invention and from an inspection of the several figures of the drawings, that the apparatus is provided with two sets of actuating mechanisms for feeding or moving the indicating tape in opposite directions, according to the direction of travel of the car, going in what is known in the "In" or the "Out" or in the "Up" or "Down" directions, the mechanism on the one side being locked or held, automatically, against turning in the wrong direction, when the mechanism on the one side is being actuated by the guard or conductor, during the "Out" or "Down" trip; and, vice versa, during the "In" or "Up" trip, the previously locked mechanism being actuated by the guard or conductor whereby the previously operative mechanism is automatically brought into its locked or held relation, and whereby it is prevented from turning in the wrong direction. Thus, by pulling on either one of the two straps connected with the said operating or actuating mechanisms, in the manner to be presently more fully described, the indicating tape can be moved in either direction, as may be desired, and at any time.

Referring now to Figs. 1 to 10 inclusive, this apparatus is adapted for use more especially with the frame-work at the end of a car, and the wording on the tape is arranged in such a manner that the name of the station or street can be read by a person standing on the platform of the car, as well as by persons within the car. In said figures, the reference characters 1, 2, 3 and 4 indicate suitable parts of the frame-work of the apparatus, and 5 and 6 are two frame-plates suitably secured to the said parts, substantially as illustrated in Figs. 2, 3, 4 and 5 of the drawings, and being respectively provided with the windows 7 and 8. Suitably secured between the frame-portions 1 and 2 are a pair of end-frames or plates 9 and 10. The said frame or plate 9 is provided with a pair of inwardly extending projections 11 and 12 forming stops, and the frame or plate 10 is provided with a pair of inwardly extending projections 13 and 14, also forming stops, and all for the purposes to be presently described.

Arranged in bearings 15 in the side-frames or plates 9 and 10 and fixed against rotation in said bearings is a shaft or spindle 16 on which there is loosely mounted a cylinder or drum 17 of any suitable material, the same being preferably provided with a frictional covering 18 of rubber, or any other suitable material. Upon the same shaft or spindle 16 and located at the opposite ends of the said cylinder or drum 17 are gear wheels 19 and 20, the same being preferably secured to the sides of the drum or cylinder 17, as illustrated. Loosely mounted upon the said shaft or spindle 16, between the inner surface of the end-frame or plate 9 and the said gear 19 is an actuating device, illustrated more particularly in Figs. 2, 5, 6 and 7, to be hereinafter described, and by means of which the said cylinder or drum is made to receive an intermittent rotary motion in the one direction. Arranged in bearings 21 in the side frames or plates 9 and 10 and fixed in said bearings against rotation is another shaft or spindle 22 on which there is loosely mounted a cylinder or drum 23, of any suitable material, the same being preferably provided with a frictional covering 24 of rubber, or any other suitable material. Upon this same shaft or spindle 22 and located on opposite ends of the said cylinder or drum 23 are a pair of gear wheels 25 and 26, the gear 25 being in mesh with the previously mentioned gear 19, and the gear 26 being likewise in mesh with the gear 20. Loosely arranged upon the said shaft or spindle 22, between the inner surface of the end-frame or plate 10 and the said gear 26, is another actuating device, illustrated more particularly in Figs. 3 and 4, to be hereinafter described, by means of which the said shaft 22 and the cylinder or drum 23 receive an intermittent rotary motion in the opposite direction from that hereinabove stated. Thus, it will be seen, that by means of the gears, when the cylinder or drum 17 is rotated in the one direction by the actuating device on said shaft or spindle 16, the other drum or cylinder 23 will receive a corresponding rotary motion; and, vice versa, when the said cylinder or drum 23 is rotated by the actuating device on the shaft or spindle 22, the gears will cause a corresponding movement of the cylinder or drum 17 on the shaft 16.

Referring now to Figs. 1, 2, 3, 4 and 5, it will be seen, that there are secured upon the frame-portion 2, a pair of brackets 27 provided with bearings 28 carrying a suitable spring-controlled roller 29, or other suitable roller upon or from which the indicating tape can be reeled. Upon this roller is reeled this indicating tape or sheet 30, of paper or other suitable material, bearing upon its opposite sides the names of stations or streets which are to be exposed to view, from time to time, at the windows 8 and 7 of the apparatus. That this indicating tape or sheet 30 may be properly fed past the said windows, the said tape or sheet is first passed over a set of rollers 31 and 32, then between the said cylinders or drums 17 and 23, and then over a second set of rollers 33 and 34 past the window 7, the tape or sheet 30 being finally reeled upon another spring-controlled or other suitable roller 35. These various rollers are provided at their ends with suitable journals rotatively arranged in bearings in the said end frames or plates 9 and 10, as clearly illustrated. It will thus be clearly understood, that the tape or sheet 30 may receive an intermittent movement from the cylinders or drums in either direction past the windows 7 and 8, the sheet being unreeled from the roller 28 and reeled upon the roller 35, or vice versa, according to the direction of the rotation of said cylinders or drums and the consequent movement of the sheet or tape 30 between the said cylinders or drums.

I will now describe the construction of and the operation of the actuating device for producing the initial rotary motion of the said shaft or spindle 16 and the cylinder or drum 17, and gear wheels 19 and 20. This actuating device, as will be seen from an inspection of Figs. 2, 5, 6 and 7, consists, essentially, of a cylinder or drum 36, which is loosely mounted upon the said shaft or spindle 16, and has connected therewith a spiral spring 37 which has its one end secured to said shaft or spindle and its other end fastened to the said cylinder or drum 36. This drum or cylinder is preferably a hollow cylinder, in which the said spring is arranged, as clearly illustrated in the said Fig. 7. The said cylinder or drum 36 is made with an extension 38, of any suitable configuration, with which is connected in any suitable manner, a spring-dog or pawl 39, the end-portion of which is normally in operative engagement with the gear-wheel 19, or with other suitable means connected therewith, for actuating the said gear. The said cylinder or drum 36 is also provided on its side which is nearest the end frame or plate 9 with a pair of lugs 40 and 41, the lug 40 being normally in engagement with the stop 11 on the frame 9, to limit the return movement of the cylinder or drum 36 after it has been operated and is returned by the action of the spring 37, and the lug 41 being adapted to be brought in contact with the stop 12 also on said frame or plate 9 to limit the operative movement of the said cylinder or drum 36. The said cylinder or drum 36 is actuated from a lever 42 which is pivotally arranged on said shaft or spindle 16, as shown, and has secured to its free end a pull-cord or strap 43. This cord or strap passes through a duct 44 in the extension 38 and leads to any suitable point in reach of the guard or conductor, not shown in the drawings, whereby when pulled the said lever 42 is brought against the projection 41 and the drum or cylinder 36 is moved. The movement of the drum or cylinder 36 causes the dog or pawl 39 to actuate the gear 19, and in consequence thereof, the cylinders or drums 17 and 23 will be rotated in proper directions, whereby the tape or sheet 30 is fed between the cylinders or drums 17 and 23, in the manner hereinabove stated. That the said lever may not be forcibly brought in contact with the projection 41 when too great a pull is exerted upon the cord or strap 43, the said extension 38 may be provided with a socket-portion 45 through which the cord or strap 43 passes, as is shown in Fig. 7 of the drawings, a coiled spring 46 encircling this portion of the said cord or strap and being in contact with a part of the lever 42 to take up the sudden contact, as will be clearly evident.

As has been previously stated, while the hereinabove described actuating mechanism on the shaft or spindle 16 is in operation, the actuating mechanism on the shaft or spindle 22 is locked or held against turning; but, that the said drum or cylinder 23 and the gears 25 and 26 may turn with the cylinder 17 and the gears 19 and 20 on the shaft or spindle 16, a spring-dog 47 normally in mesh with the gear 26 or with the actuating means connected with said gear, must be forced from its holding engagement with the said gear. Before describing the means for thus disengaging the said dog or pawl 47 from its holding engagement with said gear 26, I will now first describe the construction and manner of operating this actuating device. This device, as will be seen from an inspection of Figs. 3 and 4, consists, essentially, of a cylinder or drum 48 which is loosely mounted upon the said shaft or spindle 22 and is provided with a spiral spring 49, in the manner of the said spring represented in Fig. 7. The said cylinder or drum 48 is made with an extension 50 of any suitable configuration and has connected therewith a spring-dog 47, preferably in the manner represented in said Fig. 6 of the drawings, the end-portion of said spring-dog 47 being normally in engagement with the gear 26. The said cylinder or drum 48 is also provided on its side nearest the end-frame or plate 10 with a pair of lugs 51 and 52, the lug 51 being normally in engagement with the stop 13 on the frame 10 to limit the return movement of the cylinder or drum 48 after it has been operated and is returned by the action of the spring 49, and the lug 52 being adapted to be brought in contact with the stop 14 also on said frame or plate

10 to limit the operative movement of the said cylinder or drum 48. The said drum or cylinder 48 is actuated from a lever 53 which is pivotally arranged on said shaft or spindle 22, as illustrated, and has attached to its free end a pull-cord or strap 54. This cord or strap 54 passes through a duct and socket in the said extension 50 in the manner illustrated in said Fig. 7 and has a coiled spring 55 for the purposes above mentioned.

When the cord or strap 54 is pulled the movement of the lever 53, by said lever being brought against the projection 52, actuates the cylinder or drum 48 and causes the dog or pawl 47 to actuate the gear 26, in consequence thereof turning the cylinders or drums 23 and 17 in opposite directions from those previously set forth. When this cylinder or drum 48 is rendered active, it will be necessary to disengage the spring-dog or pawl 39 from its holding engagement with the gear 19, so that the said gears 19 and 20 and the cylinder or drum 17 on the shaft 16 will operate in the right direction, and at the same time, that the actuating cylinder or drum 36 on said shaft or spindle 16 will be locked against turning.

I will now set forth, the manner of disengaging the dog or pawl 47 from its holding engagement with the gear 26, and the manner of locking the cylinder or drum 48 against turning upon the shaft or spindle 22, when the cylinder or drum 36 is being actuated; and, I will then proceed to describe the manner of releasing the dog or pawl 39 from its holding engagement with the gear 19 and the manner of locking the cylinder or drum 36 against turning on the shaft or spindle 16, when the cylinder or drum 48 is being actuated.

Now, referring to Figs. 2 and 5, it will be seen that when the lever 42 moves in the direction of the arrow Z, its end 56 is brought in sliding contact with the curved edge-portion of a segmental arm 57 which is attached to an oscillating shaft or spindle 58 movably arranged in the bearings 59 in said side frames or plates 9 and 10. Upon the opposite end-portion of the said shaft or spindle 58 is secured a lever or arm 60 having a forked or bifurcated end 61 which is in slidable engagement with a pin or projection 63 on an oscillating arm 62. This arm 62, as will be seen from Figs. 3 and 4, is fulcrumed upon a pin or pivot 64 arranged upon a brace 65 which is suitably secured to the framework, as shown, and the lower end of said arm 62 is made with a nosing or hook-end 66. Normally, these parts stand in their relative positions indicated in Fig. 3 of the drawings, but when the end-portion 56 of the arm or lever 42 forces the segmental arm 57 into the dotted position, indicated in Fig. 2 of the drawings, the spindle or shaft 58 thereby being partially rotated, then the lever or arm 60 and the arm 62 will assume the positions indicated in Fig. 4, and an extension 67 on said arm 62, see Fig. 1, will be brought against the spring-dog or pawl 47 and thereby force the same from its holding engagement with the gear 26, as clearly indicated in Fig. 4, thereby allowing the cylinder or drum on said shaft or spindle 16 to operate the cylinder or drum on the shaft or spindle 22. At the same time the nosing 66 of the arm 62 is brought in holding engagement with a shoulder or projection 68 on the extension 50, see Fig. 4, and the said cylinder or drum 48 is held against turning on the said shaft or spindle 22. Now, when the arm 53 is actuated by a pull on the cord or strap 54, then its end 69 is brought in sliding engagement with the curved edge of a segmental arm 70 which is fixed to an oscillating shaft or spindle 71 movably arranged in bearings 72 in the said end-frame or plates 9 and 10. This action produces a partial movement of said spindle 71 in its bearings 72 and thereby forces an extension 75 on the end-portion 74 of a pawl or dog 73 affixed to said spindle or shaft 71 in engagement with the spring-dog or pawl 39, see Fig. 1, and forces the latter from its engagement with the gear 19 on said shaft or spindle 16, as illustrated in Fig. 5, thereby permitting the cylinder or drum on the shaft or spindle 22 to operate the cylinder or drum on the shaft or spindle 16, as will be clearly evident. At the same time, the end 74 of the said pawl or dog 73 will be brought against a shoulder or projection 76 of the extension 38 of the cylinder or drum 36, as indicated in Fig. 5, and the said drum or cylinder 36 is held against turning upon the shaft or spindle 16. Thus it will be clearly evident, that a simply constructed and efficiently operating mechanism is the result for feeding the indicating tape or sheet in either direction, at the pleasure of the guard or conductor of the car, and the device or apparatus can be used for exposing the name of a station or street from oppositely placed windows, so that it can be read from different parts of a car.

In Fig. 11 of the drawings, I have represented a slightly modified arrangement of the station or street indicator embodying the principles of my invention. In this device, which is adapted for suspension more especially in the middle of a car, the general construction of the operating mechanism is the same as that herein-above described, the mechanism being arranged in a horizontal relation, instead of the vertical relation indicated in Figs. 1 to 10 inclusive; and, in fact, the only difference is in the construction of the casing, and the locations of the roller 29 and 35, these being located for the sake of saving space between the rollers 31 and 32, and 33 and 34, respectively. This casing consists, essentially, of suitable ends 77, a top 78, a bottom 79, and sides 80 provided with oppositely located windows 81 past which the indicating tape or paper is moved in the manner hereinabove previously described, and as will be clearly understood from an inspection of said Fig. 11 of the drawings.

I claim:—

1. In a street or station indicator, the combination with a pair of main shafts, and a tape-feeding cylinder, of intermeshing gears on said shafts, a spring-controlled actuating cylinder loosely arranged on each shaft, laterally extending stops on each actuating cylinder, an actuating lever on each shaft movably arranged between each pair of stops on each actuating cylinder, and a holding means connected with each actuating cylinder in engagement with a gear on one of the shafts, substantially as and for the purposes set forth.

2. In a street or station indicator, the combination, with a pair of main shafts, and a tape-feeding cylinder, of intermeshing gears on said shafts, an actuating cylinder on each shaft, a pair of stops on each actuating cylinder, an actuating lever on each shaft movably arranged between each pair of stops on each actuating cylinder, a pair of oscillating spindles, a segmental arm on each spindle, one of said arms being in engagement with one of the actuating levers and the other of said arms with the other of said actuating levers, and means connected with said oscillating spindles for rendering the said actuating cylinders inactive, substantially as and for the purposes set forth.

3. In a street or station indicator, the combination, with a pair of main shafts, and a tape-feeding cylinder, of intermeshing gears on said shafts, an actuating cylinder on each shaft, a pair of stops on each actuating cylinder, an actuating lever on each shaft movably arranged between each pair of stops on each actuating cylinder, a pair of oscillating spindles, a segmental arm on each spindle, one of said arms being in engagement with one of the actuating levers and the other of said arms with the other of said actuating levers, means connected with said oscillating spindles for rendering the said actuating cylinders inactive, and a holding means on each actuating cylinder in engagement with a gear on one of the shafts, substantially as and for the purposes set forth.

4. In a street or station indicator, the combination, with a pair of main shafts, a feeding cylinder on each shaft, intermeshing gears also on said shafts, an indicating tape between said cylinders, an actuating cylinder loosely arranged on each shaft, laterally extending stops on each actuating cylinder, an actuating lever on each shaft movably arranged between each pair of stops on each actuating cylinder, and a holding means connected with each actuating cylinder in engagement with a gear on one of the shafts, substantially as and for the purposes set forth.

5. In a street or station indicator, a pair of main shafts, a feeding cylinder on each shaft, intermeshing gears also on said shafts, an indicating tape between said cylinders, an actuating cylinder loosely arranged on each shaft, laterally extending stops on each actuating cylinder, an actuating lever on each shaft movably arranged between each pair of stops on each actuating cylinder, a holding means connected with each actuating cylinder in engagement with a gear on each shaft and an intermediately placed mechanism for forcing the holding means on the one actuating cylinder out of its holding engagement with the gear on the one shaft, while the holding means on the other actuating cylinder is in its holding engagement with the gear on the other shaft, substantially as and for the purposes set forth.

6. In a street or station indicator, a pair of main shafts, a feeding cylinder on each shaft, intermeshing gears also on said shafts, an indicating tape between said cylinders, an actuating cylinder on each shaft, laterally extending stops on each actuating cylinder, an actuating lever on each shaft movably arranged between each pair of stops on each actuating cylinder, means connected with each actuating cylinder for moving it in one direction, a spring connected with each actuating cylinder for returning the actuated cylinder to its normal initial position, and a holding means on each actuating cylinder in engagement with a gear on one of the shafts, substantially as and for the purposes set forth.

7. In a street or station indicator, a pair of main shafts, a feeding cylinder on each shaft, intermeshing gears also on said shafts, an indicating tape between said cylinders, an actuating cylinder on each shaft, an extension on each actuating cylinder provided with a pull-cord, a pair of stops on each actuating cylinder, an actuating lever on each shaft movably arranged between each pair of stops of each actuating cylinder, and a spring connected with each actuating cylinder for returning the actuated cylinder to its normal initial position, substantially as and for the purposes set forth.

8. In a street or station indicator, a pair of main shafts, a feeding cylinder on each shaft, intermeshing gears also on said shafts, an indicating tape between said cylinders, an actuating cylinder on each shaft, an extension on each actuating cylinder, a pair of stops on each actuating cylinder, an actuating lever on each shaft movably arranged between each pair of stops of each actuating cylinder, a spring connected with each actuating cylinder for returning the actuated cylinder to its normal initial position, and a holding means on each actuating cylinder in engagement with a gear on one of the shafts, substantially as and for the purposes set forth.

9. In a street or station indicator, a pair of main shafts, a feeding cylinder on each shaft, intermeshing gears also on said shafts, an indicating tape between said cylinders, an actuating cylinder on each shaft, an extension on each actuating cylinder, a pair of stops on each actuating cylinder, an actuating lever on each shaft movably arranged between each pair of stops of each actuating cylinder, a spring connected with each actuating cylinder for returning the actuated cylinder to its normal initial position, a holding means on each actuating cylinder in engagement with a gear on one of the shafts, and an intermediately placed mechanism for forcing the holding means on the one actuating cylinder out of its holding engagement with the gear on the one shaft, while the holding means on the other actuating cylinder is in its holding engagement with the gear on the other shaft, substantially as and for the purposes set forth.

10. In a street or station indicator, a casing, comprising side frames, a pair of main shafts in said casing, a feeding cylinder on each shaft, intermeshing gears also on said shafts, an indicating tape between said cylinders, a pair of stops on each side frame, an actuating cylinder on each shaft, an extension on each actuating cylinder, a pair of stops on each actuating cylinder, an actuating lever on each shaft movably arranged between each pair of stops on each actuating cylinder, and a spring connected with each actuating cylinder for returning the actuated cylinder to its normal initial position, substantially as and for the purposes set forth.

11. In a street or station indicator, a casing, comprising side frames, a pair of main shafts in said casing, a feeding cylinder on each shaft, intermeshing gears also on said shafts, an indicating tape between said cylinders, a pair of stops on each side frame, an actuating cylinder on each shaft, an extension on each actuating cylinder, a pair of stops on each actuating cylinder, an actuating lever on each shaft movably arranged between each pair of stops on each actuating cylinder, a spring connected with each actuating cylinder for returning the actuated cylinder to its normal initial position, and a holding means on each actuating cylinder in engagement with a gear on one of the shafts, substantially as and for the purposes set forth.

12. In a street or station indicator, a casing, comprising side frames, a pair of main shafts in said casing, a feeding cylinder on each shaft, intermeshing gears also on said shafts, an indicating tape between said cylinders, a pair of stops on each side frame, an actuating cylinder on each shaft, an extension on each actuating cylinder, a pair of stops on each actuating cylinder, an actuating lever on each shaft movably arranged between each pair of stops on each actuating cylinder, a spring connected with each actuating cylinder for returning the actuated cylinder to its normal initial position, a holding means on each actuating cylinder in engagement with a gear on one of the shafts, and an intermediately placed mechanism for forcing the holding means on the one actuating cylinder out of its holding engagement with the gear on the one shaft, while the holding means on the other actuating cylinder is in its holding engagement with the gear on the other shaft, substantially as and for the purposes set forth.

13. In a street or station indicator, a pair of main shafts, a feeding cylinder on each shaft, intermeshing gears also on said shafts, an actuating cylinder on each shaft, a pair of stops on each actuating cylinder, an actuating lever on each shaft movably arranged between each pair of stops on each actuating cylinder, a pair of oscillating spindles 58 and 71, a segmental arm on each spindle, one of said arms being in engagement with one of the actuating levers and the other of said arms with the other of said actuating levers, and means connected with said spindles 58 and 71 for rendering the said actuating cylinders inactive, substantially as and for the purposes set forth.

14. In a street or station indicator, a pair of main shafts, a feeding cylinder on each shaft, intermeshing gears also on said shafts, an actuating cylinder on each shaft, a pair of stops on each actuating cylinder, an actuating lever on each shaft movably arranged between each pair of stops on each actuating cylinder, a pair of oscillating spindles 58 and 71, a segmental arm on each spindle, one of said arms being in engagement with one of the actuating levers and the other of said arms with the other of said actuating levers, means connected with said spindles 58 and 71 for rendering the said actuating cylinders inactive, and a holding means on each actuating cylinder in engagement with a gear on one of the shafts, substantially as and for the purposes set forth.

15. In a street or station indicator, a pair of main shafts, a feeding cylinder on each shaft, intermeshing gears also on said shafts, an actuating cylinder on each shaft, a pair of stops on each actuating cylinder, an actuating lever on each shaft movably arranged between each pair of stops on each actuating cylinder, a pair of oscillating spindles 58 and 71, a segmental arm on each spindle, one of said arms being in engagement with one of the actuating levers and the other of said arms with the other of said actuating levers, means connected with said spindles 58 and 71 for rendering the said actuating cylinders inactive, a holding means on each actuating cylinder in engagement with a gear on one of the shafts, and an intermediately placed mechanism for forcing the holding means on the one actuating cylinder out of its holding engagement with the gear on the one shaft, while the holding means on the other actuating cylinder is in its holding engagement with the gear on the other shaft, substantially as and for the purposes set forth.

16. In a street or station indicator, a pair of main shafts, a feeding cylinder on each shaft, intermeshing gears also on said shafts, an indicating tape between said cylinders, a hollow actuating cylinder on each shaft, an extension on each hollow cylinder provided with a cord-receiving duct, a pair of stops on each hollow cylinder, an actuating lever on each shaft movably arranged between each pair of stops of each hollow cylinder, a spring in each hollow cylinder for returning the actuated cylinder to its normal initial position, a pair of oscillating spindles 58 and 71, a segmental arm on each spindle, one of said arms being in engagement with one of the actuating levers and the other of said arms with the other of said actuating levers, and means connected with said spindles 58 and 71 for rendering said hollow cylinders inactive, substantially as and for the purposes set forth.

17. In a street or station indicator, a pair of main shafts, a feeding cylinder on each shaft, intermeshing gears also on said shafts, an indicating tape between said clyinders, a hollow actuating cylinder provided with a cord-receiving duct, a pair of stops on each hollow cylinder, an actuating lever on each shaft movably arranged between each pair of stops of each hollow cylinder, a spring in each hollow cylinder for returning the actuated cylinder to its normal initial position, a pair of oscillating spindles 58 and 71, a segmental arm on each spindle, one of said arms being in engagement with one of the actuating levers and the other of said arms with the other of said actuating levers, means connected with said spindles 58 and 71 for rendering the hollow cylinders inactive, and a holding means on each hollow cylinder in engagement with a gear on one of the shafts, substantially as and for the purposes set forth.

18. In a street or station indicator, a pair of main shafts, a feeding cylinder on each shaft, intermeshing gears also on said shafts, an indicating tape between said cylinders, a hollow actuating cylinder on each shaft, an extension on each hollow cylinder provided with a cord-receiving duct, a pair of stops on each hollow cylinder, an actuating lever on each shaft movably arranged between each pair of stops of each hollow cylinder, a spring in each hollow cylinder for returning the actuated cylinder to its normal initial position, a pair of oscillating spindles 58 and 71, a segmental arm on each spindle, one of said arms being in engagement with one of the actuating levers and the other of said arms with the other of said actuating levers, means connected with said spindles 58 and 71 for rendering said hollow cylinders inactive, a holding means on each hollow cylinder in engagement with a gear on one of the shafts, and an intermediately placed mechanism for forcing the holding means on the one actuating cylinder out of its holding engagement with the gear on the one shaft, while the holding means on the other hollow actuating cylinder is in its holding engagement with the gear on the other shaft, substantially as and for the purposes set forth.

In testimony that he did claim the invention set forth above I have hereunto set my hand this 26th day of February, 1906.

BENJAMIN B. BEACH,
*Administrator of Harry E. Beach, deceased.*

Witnesses:
    FREDK. C. FRAENTZEL,
    GEO. D. RICHARDS.